United States Patent
Belter et al.

(10) Patent No.: US 11,999,214 B2
(45) Date of Patent: Jun. 4, 2024

(54) ACCUMULATORS FOR A DISTRIBUTED ACTIVE SUSPENSION SYSTEM

(71) Applicant: ClearMotion, Inc., Billerica, MA (US)

(72) Inventors: Joseph Thomas Belter, Somerville, MA (US); Jason Steven Sirois, Atkinson, NH (US)

(73) Assignee: ClearMotion, Inc., Billerica, MA (US)

( * ) Notice: Subject to any disclaimer, the term of this patent is extended or adjusted under 35 U.S.C. 154(b) by 531 days.

(21) Appl. No.: 17/251,571

(22) PCT Filed: Jun. 14, 2019

(86) PCT No.: PCT/US2019/037218
§ 371 (c)(1),
(2) Date: Dec. 11, 2020

(87) PCT Pub. No.: WO2019/241650
PCT Pub. Date: Dec. 19, 2019

(65) Prior Publication Data
US 2021/0252935 A1    Aug. 19, 2021

Related U.S. Application Data

(60) Provisional application No. 62/740,823, filed on Oct. 3, 2018, provisional application No. 62/691,132, filed
(Continued)

(51) Int. Cl.
*B60G 17/08* (2006.01)
*B60G 13/08* (2006.01)
(Continued)

(52) U.S. Cl.
CPC ............. *B60G 17/08* (2013.01); *B60G 13/08* (2013.01); *B60G 17/0165* (2013.01);
(Continued)

(58) Field of Classification Search
CPC ............. B60G 2202/154; B60G 13/14; B60G 17/0152; B60G 2202/416; B60G 2400/50; B60G 2400/91; B60K 25/10; F15B 1/021
See application file for complete search history.

(56) References Cited

U.S. PATENT DOCUMENTS 3,470,692 A    10/1969   Kamp
5,468,018 A    11/1995   Redman et al.
(Continued)

FOREIGN PATENT DOCUMENTS

EP         2 868 932 A1    5/2015
WO    WO 02/055327 A1    7/2002
(Continued)

OTHER PUBLICATIONS

International Search Report and Written Opinion dated Sep. 10, 2019 in connection with International Application No. PCT/US2019/037218.
(Continued)

*Primary Examiner* — James A English
*Assistant Examiner* — Caitlin Anne Miller
(74) *Attorney, Agent, or Firm* — Wolf, Greenfield & Sacks, P.C.

(57) ABSTRACT

Presented herein, inter alia, are suspension system components having tuned accumulator sizing and/or stiffness. Such suspension system components are envisioned for use in a distributed active suspension system of a vehicle. In particular, through appropriate sizing of accumulators of a suspension system component of a vehicle, ride quality of the vehicle may be improved and so called "rough ride" issues may be precluded. Alternatively or additionally, various valves or alternative compliant mechanisms may be
(Continued)

included in the suspension system component, so that desirable performance may be obtained for a range of operating conditions.

11 Claims, 14 Drawing Sheets

Related U.S. Application Data on Jun. 28, 2018, provisional application No. 62/684,899, filed on Jun. 14, 2018.

(51) Int. Cl.
*B60G 17/0165* (2006.01)
*F16F 9/06* (2006.01)
*F16F 9/512* (2006.01)

(52) U.S. Cl.
CPC .............. *F16F 9/061* (2013.01); *F16F 9/065* (2013.01); *F16F 9/512* (2013.01); *B60G 2202/24* (2013.01); *B60G 2204/62* (2013.01); *B60G 2206/41* (2013.01); *B60G 2500/104* (2013.01); *B60G 2600/182* (2013.01); *B60G 2800/162* (2013.01); *F16F 2222/12* (2013.01); *F16F 2228/004* (2013.01); *F16F 2228/066* (2013.01); *F16F 2232/08* (2013.01); *F16F 2234/02* (2013.01)

(56) References Cited

U.S. PATENT DOCUMENTS

| | | | | |
|---|---|---|---|---|
| 5,600,955 | A * | 2/1997 | Sahinkaya | ............... B62D 5/22 180/441 |
| 6,293,530 | B1 | 9/2001 | Delorenzis et al. | |
| 7,497,452 | B2 * | 3/2009 | Schedgick | ......... B60G 17/0416 280/124.159 |
| 7,766,343 | B2 | 8/2010 | Bauer | |
| 9,702,349 | B2 * | 7/2017 | Anderson | ............ B60G 17/052 |
| 10,890,197 | B2 * | 1/2021 | Belter | ..................... F16F 9/065 |
| 2002/0114716 | A1 | 8/2002 | Takagi et al. | |
| 2004/0004316 | A1 | 1/2004 | Robertson | |
| 2004/0013548 | A1 | 1/2004 | Seto et al. | |
| 2007/0278752 | A1 | 12/2007 | Schedgick | |
| 2009/0051130 | A1 | 2/2009 | Huth | |
| 2009/0260935 | A1 | 10/2009 | Avadhany et al. | |
| 2010/0072760 | A1 | 3/2010 | Anderson et al. | |
| 2010/0262308 | A1 | 10/2010 | Anderson et al. | |
| 2011/0068552 | A1 | 3/2011 | Ryan et al. | |
| 2014/0265168 | A1 | 9/2014 | Giovanardi et al. | |
| 2014/0294601 | A1 | 10/2014 | O'Shea et al. | |
| 2015/0240812 | A1 | 8/2015 | Kemnitz | |
| 2018/0022179 | A1 * | 1/2018 | Collins | .............. B60G 17/0424 280/5.5 |

FOREIGN PATENT DOCUMENTS

| | | | |
|---|---|---|---|
| WO | WO 03/066425 A1 | 8/2003 | |
| WO | WO 2009/130059 A1 | 10/2009 | |
| WO | WO 2011/154026 A1 | 12/2011 | |
| WO | WO 2011/159874 A2 | 12/2011 | |
| WO | WO 2014/145018 A2 | 9/2014 | |
| WO | WO 2017/184651 A1 | 10/2017 | |
| WO | WO 2017/210492 A1 | 12/2017 | |
| WO | WO-2018148689 A1 * | 8/2018 | ............. B60G 11/30 |

OTHER PUBLICATIONS

International Preliminary Report on Patentability dated Dec. 24, 2020 in connection with International Application No. PCT/US2019/037218.
[No Author Listed], Inline Pulse-ToneTM Hydraulic Shock Suppressors. Catalog HY10-1630/US. Parker Hannifin Global Accumulator Division United States. Retrieved from the WayBack Machine on Mar. 8, 2019, noting date of Nov. 22, 2015. pp. 71-80.
Corbo et al., Practical design against pump pulsations. Proceedings of the Twenty-Second International Pump Users Symposium. Conference date: Feb. 2005. pp. 137-177.
Mcgehee et al., Hydraulic accumulators tame shock and vibration. News content from Machine Design. Mar. 2, 2011. 9 pages.
Minav, Axial piston pump flow ripple compensation by adjusting the pump speed with an electric drive. The twelfth Scandinavian International Conference on Fluid Power, May 18-20, 2011. Tampere, Finland.
Wachel et al., Understanding how pulsation accumulators work. Reprinted from Pipeline Engineering Symposium. Jan. 10-13, 1988. PD—vol. 14. pp. 23-31.

* cited by examiner

ACCUMULATORS FOR A DISTRIBUTED ACTIVE SUSPENSION SYSTEM

CROSS-REFERENCE TO RELATED APPLICATIONS

This application is a national stage filing under 35 U.S.C. § 371 of International Patent Application Serial No. PCT/US2019/037218, filed Jun. 14, 2019, which claims the benefit under 35 U.S.C. § 119(e) of U.S. provisional application Ser. No. 62/684,899, filed Jun. 14, 2018; U.S. provisional application Ser. No. 62/691,132, filed Jun. 28, 2018; and U.S. provisional application Ser. No. 62/740,823, filed Oct. 3, 2018; the disclosures of each of which are incorporated by reference in their entirety.

BACKGROUND

Active vehicle suspension systems have the potential to overcome some of the known issues and trade-offs associated with passive or semi-active suspension systems. However, the effort to implement active suspension systems in production vehicles has been confounded by a number of complex problems for which both the causes and solutions are not yet known in the art.

SUMMARY

In one aspect, a suspension system component is disclosed that includes: a hydraulic cylinder at least partially defining an internal volume; a piston slidably inserted into the hydraulic cylinder, thereby dividing the internal volume into a compression chamber and an extension chamber; a piston rod attached to the piston and extending out of the hydraulic cylinder; a hydraulic pump that includes a first port in fluid communication with the compression chamber and a second port in fluid communication with the extension chamber; a compression accumulator arranged to exchange fluid with the compression chamber; an extension accumulator arranged to exchange fluid with the extension chamber. In certain embodiments, when the hydraulic pump generates a first commanded pressure differential, an observed stiffness of the suspension system component in response to an external input having a frequency of 12 Hz and a peak to peak amplitude of 5 mm does not exceed 80 N/mm, wherein the first commanded pressure differential has a value of at least 1,000 psi. In certain embodiments, the first commanded pressure differential has a value of 1,000 psi. In certain embodiments, the observed stiffness is equal to or greater than 5 M/mm, 10 N/mm, or 25 N/mm. In certain embodiments, the observed stiffness is less than or equal to 80 N/mm, 70 N/mm, or 50 N/mm.

In another aspect, a vehicle is disclosed that includes a suspension system comprising the aforemetioned suspension system component. In certain embodiments, the vehicle includes a suspension system includes a plurality of suspension system components as described herein. In certain embodiments, the vehicle further includes a sprung mass and an unsprung mass, and wherein each suspension system component of the plurality of suspension system components is arranged between an unsprung mass of the vehicle and a sprung mass of the vehicle. In certain embodiments, each suspension system component of a vehicle is fluidly isolated from any other suspension system component of the vehicle.

In another aspect, a suspension system component for a vehicle is disclosed that includes: a hydraulic cylinder containing a first volume of fluid; a piston slidably received in the hydraulic cylinder, thereby dividing at least a portion of the hydraulic cylinder into an extension chamber and a compression chamber; a piston rod attached to the piston; a compression accumulator containing a second volume of fluid, wherein the compression accumulator is in direct fluid communication with the compression chamber; an extension accumulator containing a third volume of fluid, wherein the extension accumulator is in direct fluid communication with the extension chamber; and a pump in fluid communication with both the compression chamber and the extension chamber, wherein the second volume is larger than the first volume, and wherein the third volume is larger than the first volume. In certain embodiments, the second volume is larger than the first volume by a first factor that is no less than three. In certain embodiments, the first volume is larger than the second volume by a second factor that is no less than three. In certain embodiments, the first factor and second factor are each less than 10. Also disclosed are a suspension system of a vehicle comprising a plurality of said suspension system components, and a vehicle comprising said suspension system.

In yet another aspect, a nested accumulator assembly is disclosed that comprises: a first accumulator including: a first accumulator and a second accumulator. The first accumulator may include a first accumulator housing that at least partially defines a first internal volume; and a first piston that divides the first internal volume into a first gas-charged chamber and a first hydraulic fluid chamber. The second accumulator may include a second accumulator housing that at least partially defines a second internal volume; and a second piston that divides the second internal volume into a second gas-charged chamber and a second hydraulic fluid chamber. At least a portion of the second accumulator may be disposed within the first internal volume.

In certain embodiments, the nested accumulator assembly includes one or more ports that allow fluid to ingress and/or egress the first hydraulic fluid chamber, and one or more ports that allow fluid to ingress and/or egress the second hydraulic fluid chamber. In certain embodiments, the second accumulator is entirely disposed within the first internal volume. In certain embodiments, the second accumulator is at least partially disposed within the first hydraulic fluid chamber. In certain embodiments, the entirety of the second accumulator is disposed within the first hydraulic fluid chamber. In certain embodiments, a portion of a wall of the first accumulator housing is attached to a portion of a wall of the second accumulator housing. In certain embodiments, the first accumulator housing and the second accumulator housing share at least a portion of a wall.

In certain embodiments, the nested accumulator assembly may include a gap between an outer surface of the first accumulator housing and an inner surface of the second accumulator housing. In certain embodiments, the gap acts as a fluid restriction element that restricts flow into the first hydraulic fluid chamber. In certain embodiments, the gap acts as a fluid restriction element that restricts flow out of the first hydraulic fluid chamber. In certain embodiments, the gap acts as a fluid inertance element.

BRIEF DESCRIPTION OF THE DRAWINGS

The accompanying drawings are not intended to be drawn to scale. In the drawings, each identical or nearly identical component that is illustrated in various figures may be represented by a like numeral. For the purposes of clarity, not every component may be labeled in every drawing. In the drawings.

DETAILED DESCRIPTION

Figure 1:
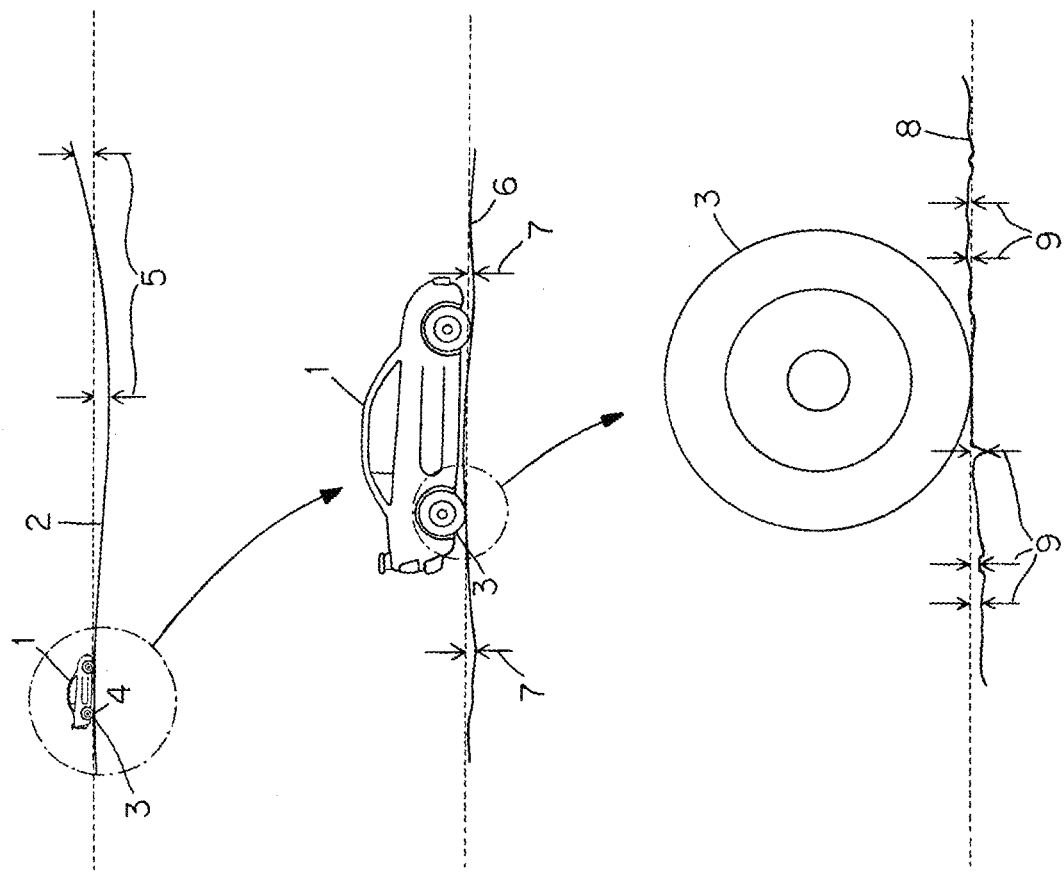
FIG. 1 illustrates various exemplary features of a road surface on which a vehicle may travel.

Vehicles generally include suspension systems that include various suspension system components. A hydraulic suspension system component of a vehicle may include a piston slidably received in a hydraulic cylinder, thereby dividing at least a portion of the hydraulic cylinder into a compression chamber and an extension chamber. This piston/cylinder arrangement is generally referred to as a damper. The damper may be disposed between an unsprung mass of the vehicle (which may include, for example, a wheel or wheel assembly) and a sprung mass of the vehicle (which may include, for example, the vehicle chassis or vehicle body). If the damper has a relatively low stiffness (e.g., it is sufficiently "soft"), it may allow for some movement of the unsprung mass while at least partially precluding movement of the sprung mass. For example, in a vehicle with a sufficiently soft suspension system, the wheels of the vehicle may traverse uneven terrain while the vehicle body remains relatively level, leading to a ride that is perceived as comfortable by an occupant of the vehicle. If, on the other hand, the damper has a relatively high stiffness (e.g., it is sufficiently "stiff"), then motion of the unsprung mass may be transferred, with only minimal loss, from the wheels, through the damper, and into the vehicle body. As a result, a vehicle with an overly stiff suspension system may be perceived as providing an uncomfortable, or "rough," ride to an occupant.

In an active hydraulic suspension system component, a hydraulic pump may be fluidly disposed between the compression chamber of the damper and the extension chamber of the damper. As recognized by the inventors and described herein, rotation of this hydraulic pump (e.g., during compression or extension of the damper) may be associated with inertia, which may lead to the damper having an undesirably high stiffness during certain driving conditions and consequently poor ride experience. Further, as recognized by the inventors, introduction of the hydraulic pump may give rise to an observed system stiffness that depends on the frequency of an input force—notably, the system may demonstrate acceptably low stiffness in response to an input having a relatively low frequency, but undesirably high stiffness in response to an input having a relatively high frequency. Described herein, inter alia, are apparatuses and methods for at least partially mitigating the effect of pump inertia on the performance of an active hydraulic suspension system component.

In addition, as described in detail herein, active suspension systems may operate over a much larger range of fluidic pressures and a larger range of sustained pressure differentials than passive or semi-active suspension systems. As a result of both pump inertia, the range of pressures and pressure differentials seen in an active suspension system component, and other reasons as described herein, the inventors have elucidated the underlying source of various problems associated with operation of an active suspension system component. Described herein are various methods and apparatuses that allow for improved performance of an active suspension system, including a suspension system component designed to maintain desired stiffness across its entire operating range and in response to a wide range of input frequencies, thereby allowing for a more desirable ride experience in an actively suspended vehicle over a wide variety of driving conditions.

Turning now to the figures, several non-limiting embodiments of various vehicles, suspension systems and suspension system components are now described in detail. It should be understood that the various systems, components, features, and methods described relative to these embodiments may be used either individually and/or in any desired combination as the disclosure is not limited to only the specific embodiments described herein.

FIG. 1 illustrates a vehicle 1 traveling on road surface 2. A wheel 3 of the vehicle 1 contacts a road surface at a contact patch 4. As the vehicle traverses the road surface, certain vertical displacements 5 of the road surface are of sufficiently large magnitude such that they are substantially greater than can be accommodated by the suspension system. These displacements will be referred to as Class I displacements. The vehicle 1 may include a passive or semi-active suspension system (not pictured) that includes a damper (also referred to as a shock absorber) and/or a spring element.

A magnified portion 6 of the road in the immediate vicinity of vehicle 1 depicts the road surface as including a variety of smaller vertical displacements 7. These displacements are smaller than the Class I displacements 5 and approximately within the range of motion of the suspension system of vehicle 1. These displacements will be referred to herein as Class II displacements. In a typical vehicle traveling at typical speeds (20-50 mph), Class II road-induced displacements are effectively transmitted to the vehicle body, but may be rapidly damped out by the shock absorbers in vehicles with passive and semi-active suspension systems.

A further magnified portion 8 of the road surface in the immediate vicinity of the wheel 3 reveals that the road surface includes additional vertical displacements 9. These additional displacements, which are herein referred to as Class III displacements, are smaller than the Class II displacements. The vertical motion of the unsprung mass induced by traversing these Class III road surface displacements are typically transferred to the unsprung mass, but may not be transferred efficiently to the sprung mass, including the vehicle body, and may additionally be damped out by the dampers of a passive or semi-active suspension system. For purposes of the disclosure herein, Class I displacements are considered displacements having a characteristic dimension that is larger than the range of motion of the suspension system of the vehicle 1; Class II displacements are displacements having a characteristic dimension that is less than the range of motion of the suspension system and greater than $\frac{1}{8}^{th}$ times the range of motion of the suspension system of the vehicle; and Class III displacements are displacements having a characteristic dimension that is less than $\frac{1}{8}^{th}$ times the range of motion of the suspension system of the vehicle.

Ideally, the suspension system of a vehicle would effectively absorb all disturbances from road inputs, thereby eliminating any motion of the vehicle body. However, suspension systems generally have limited ranges of motion and therefore cannot effectively absorb disturbances having dimensions approaching or exceeding such travel limits. The range of motion in most passive and semi-active shock absorbers is typically in the range of 10 cm to 15 cm. Therefore, variations in road elevation exceeding these limits (for example, road elevation may vary by several meters or more) may not be absorbed by a vehicle's suspension system. Only the effects of road elevation changes that are within the range of motion of a vehicle's shock absorbers may, therefore, be optimally mitigated. For example, a suspension system may be capable of at least partially mitigating motion of the vehicle body due to Class II and Class III displacements, but not due to Class I displacements.

If the damper of the vehicle 1 becomes sufficiently stiff, vertical motions induced by traversing a non-uniform road surface may be efficiently (and undesirably) transferred from the unsprung mass, through the damper, and into the vehicle body. If, on the other hand the damper (along with any parallel spring elements) are sufficiently soft, it may be possible for the suspension system to "absorb" motion of the unsprung mass within the certain frequency range while minimizing motion of the sprung mass (which includes, e.g., the vehicle body). In order to minimize such transfer of disturbances from the road surface to the vehicle body, suspension system component of a vehicle may include dampers designed to be sufficiently soft for motion within a certain frequency range (e.g. 10-15 Hz).

Figure 2C:
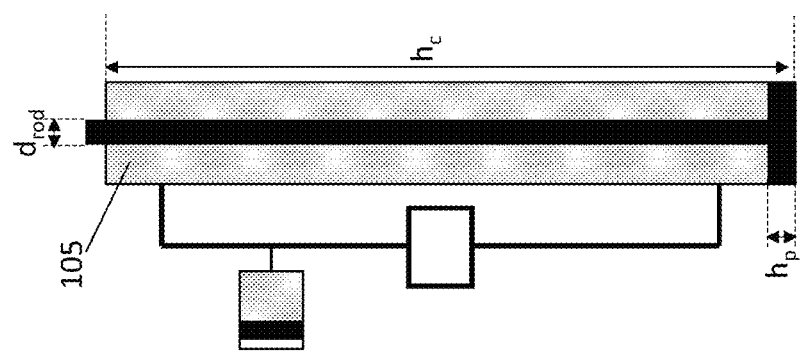
FIG. 2a-c illustrate a damper at various stages of a compression/extension stroke.
Figure 2B:
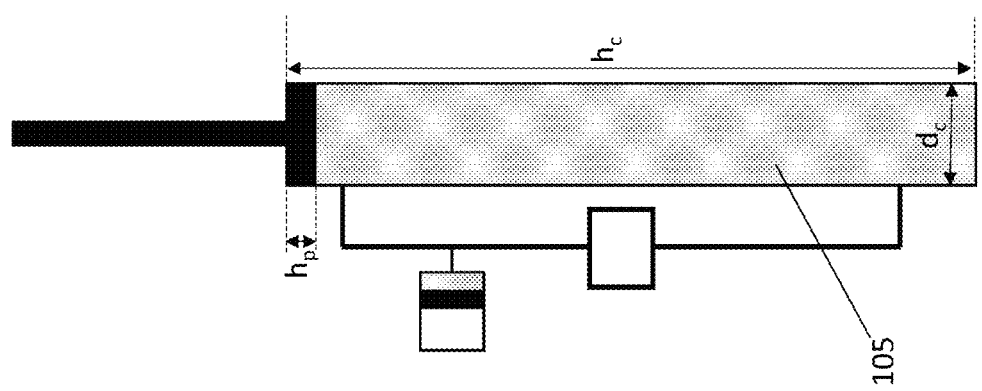
Figure 2A:
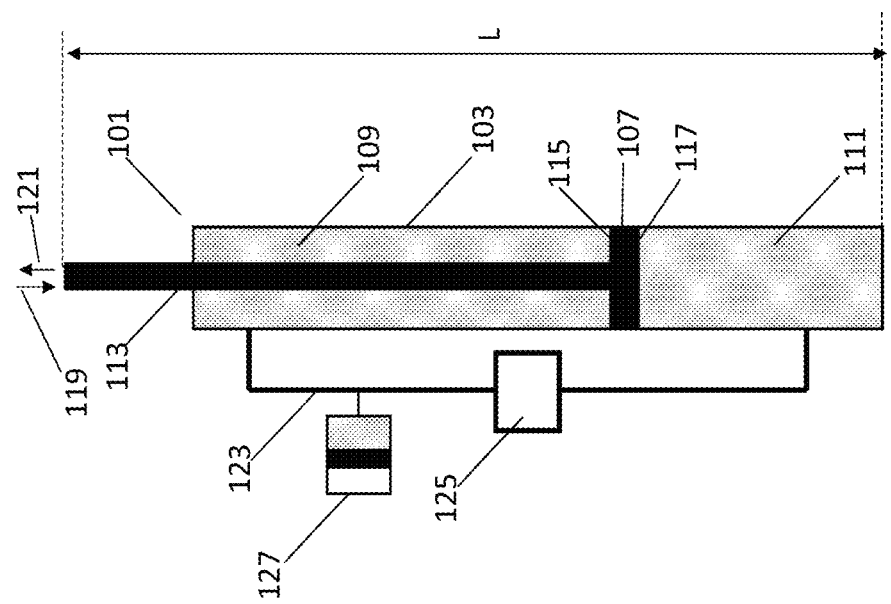

FIG. 2a-c illustrates an exemplary hydraulic damper 101 during various stages of compression/extension. The hydraulic damper includes a piston 107 that is slidably received in a hydraulic cylinder 103, thereby dividing at least a portion of the cylinder into a compression chamber 111 and an extension chamber 109. A piston rod 113 may be attached to the piston 107 and may extend out of the hydraulic cylinder 103. The length of the damper, denoted L, is understood to refer to the distance between a base of the hydraulic cylinder 103 and a distal end of the piston rod 113. This length is a function of the position of the piston within the cylinder; moving the piston in an extension direction 121 relative to the cylinder 103 results in extension of the damper (increase in length L), while moving the piston in a compression direction 119 relative to the cylinder 103 results in compression of the damper (decrease in length L). The damper further includes a flow path 123 fluidly connecting the compression chamber 111 to the extension chamber 109, as well as a flow control element 125 fluidly disposed along the flow path 123. In passive suspension systems, this flow control element 125 may be a fixed width orifice. In semi-active suspension systems this flow control element 125 may be a controllable (e.g., solenoid) valve or variable restriction. In active suspension systems, this flow control element 125 may alternatively or additionally include a hydraulic pump. Although the flow path is illustrated as being outside of the cylinder, in various embodiments it may alternatively include at least a portion that is fully within the cylinder (for example, it may be at least partially contained within the piston 107).

Continuing with FIG. 2a-c, during compression of the hydraulic damper (e.g., upon changing the damper position from that shown in FIG. 2a to that shown in FIG. 2c), an increasing portion of the piston rod 113 enters the cylinder 103, thereby decreasing the amount of volume within the cylinder 103 that is available for fluid. As a result, fluid is displaced out of the cylinder 103. As illustrated, an accumulator, 127, may be utilized to accept the displaced fluid. Likewise, during extension of the hydraulic damper (e.g., upon changing the damper position from that shown in 20a to that shown in 20b), a decreasing portion of the piston rod 113 remains in the cylinder 103, thereby increasing the amount of volume within the cylinder 103 that is available for fluid. As a result, fluid flows from the accumulator 127 and into the cylinder 103. Full extension of the damper (such as shown in FIG. 2b) or full compression of the damper (as shown in FIG. 2c) may occur, for example, when the piston 107 comes into contact with a housing of the cylinder, or with one or more "bump stops" that are attached to the housing of the cylinder, such that the damper cannot extend or compress further.

The volume of fluid contained within the hydraulic cylinder 103 at a given time may vary as the piston rod is inserted into and/or extracted from the hydraulic cylinder 103. The maximum fluid volume (denoted $V_{max}$) within the hydraulic cylinder 103 occurs when the damper is fully extended, as shown in FIG. 2b. The minimum fluid volume (denoted $V_{min}$) contained within the hydraulic cylinder occurs when the damper is fully compressed, as shown in FIG. 2c. As would be recognized by one of ordinary skill in the art, the embodiments illustrated herein are exemplary. It is understood that different damper configurations (e.g., different piston shapes, non-symmetric piston configurations, different rod arrangements, etc.) may be utilized.

During operation of a vehicle, the volume of fluid contained within the hydraulic cylinder therefore may vary between $V_{min}$ and $V_{max}$. In order to address the problem of varying fluid volumes within the cylinder as the damper is extended and compressed, it is well known that an accumulator 127 may be used, as illustrated in FIG. 2. The accumulator 127 may include a floating piston or bladder that separates a fluid chamber from a pressurized gas chamber. Alternatively the accumulator may include a spring loaded piston. The accumulator may be arranged to receive fluid from the internal chamber during compression of the damper. Likewise, the accumulator may be further arranged to provide fluid to the internal chamber during extension of the damper. The accumulator may also help with fluid volume changes associated with temperature changes.

In passive dampers, therefore, the volume of the accumulator is generally sized to accommodate the change in fluid volume that between maximum compression and maximum extension of the damper. In other words, the volume of the accumulator is sized to have a volume substantially similar to the value given by $V_{max}-V_{min}$. A relatively small amount of additional volume may be included in the accumulator to accommodate temperature effects; however, other than this minor additional volume, in general the accumulator volume is kept relatively close to the value given by $V_{max}-V_{min}$, as any substantial increase above such value increases cost and especially size of the system, which may present significant difficulties for packaging in often compact automotive applications.

Figure 3:
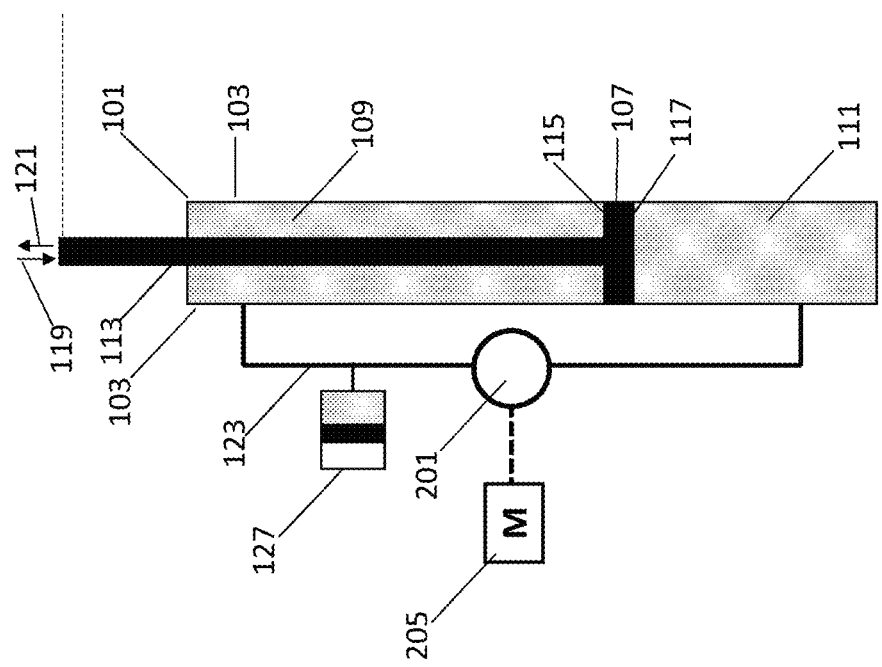
FIG. 3 illustrates an embodiment of an active suspension system component.

FIG. 3 illustrates an embodiment of a suspension system component of an active suspension system. In the illustrated embodiment, a hydraulic pump 201 is shown fluidly disposed between the compression chamber 111 of the damper and the extension chamber 109 of the damper. In various embodiments, the pump may be a gear pump (e.g., an internal gear pump (e.g., a gerotor, a crescent pump), an external gear pump), a vane pump, a variable displacement pump, or any other type of appropriate pump known in the art. As illustrated, the pump 201 may be operatively coupled to a motor 205. The motor may be, for example, an electric motor (e.g., a BLDC motor). The suspension system component illustrated in FIG. 3 may be utilized, for example, in an active suspension system of a vehicle.

In the illustrated active suspension system component of FIG. 3, the pump 201 may be utilized to actively drive compression or extension of the damper. For example, when active compression is desired, the motor 205 may be used to actively drive rotation of the pump 201 in a first direction to drive net fluid flow out of the compression chamber 211 and into the extension chamber 209. For active extension, the motor 205 may actively drive rotation of the pump 201 in a second direction to drive net fluid flow out of the extension chamber 209 and into the compression chamber 211. Use of an active suspension system therefore allows for enhanced control over vehicle position (e.g., control over the distance between the sprung mass and unsprung mass) as compared to a passive or semi-active suspension system.

For the purposes of this disclosure, the terms "active compression" and "active extension" are used to describe situations wherein the damper is compressed or extended, respectively, due to active operation of the pump. In active compression or active extension, the motor 205 may receive electrical energy from an electrical energy source (e.g., a battery, a capacitor, an alternator, or a generator), and may convert the received electrical energy into mechanical energy in the form of an applied torque on the pump 201. The pump 201 then may act to convert the mechanical energy (e.g., the applied torque) into hydraulic energy (e.g., a fluidic pressure differential, a flow, etc.). Likewise, "active force" refers to a force imparted onto the piston due to a pressure differential generated by active operation of the pump. Contrastingly, the term "external force" refers to a force imparted onto the piston due to an external input, which is understood as an input that does not arise due to active operation of the pump. External inputs may include inputs that arise from features (e.g., potholes, bumps) in a road surface; forces that arise due to cornering, braking, or acceleration of the vehicle; or forces/displacements that are applied to the piston rod by a dynamometer during evaluation. For the purposes of this disclosure, the terms "external compression" and "external extension" are used to describe compression or extension, respectively, of the damper that occurs due to external inputs, and not due to active operation of the pump. During operation of a motor vehicle, the damper may undergo external compression due to external forces introduced by external inputs such as, for example, ground surface inputs (e.g., driving over a bump in the road) and/or vehicle maneuvers such as braking, accelerating, and cornering. Likewise, the damper may undergo external extension due to external forces introduced by, for example, ground surface inputs such as driving over a pothole in the road and/or vehicle maneuvers such as braking, accelerating and cornering.

Examining FIG. 3, and assuming that the pump is off (that is, it is not being actively operated to generate a pressure differential), an external input that results in a force on the piston rod in the compression direction may cause fluid in the compression chamber 111 to become pressurized relative to fluid in the extension chamber 109, thereby generating a pressure difference between fluid in the compression chamber 111 and fluid in the extension chamber 109. This pressure difference will persist as long the external input (e.g., road surface input) is ongoing. If this pressure difference is sufficient to overcome inertia associated with the pump, then fluid may flow out of the compression chamber 111, through the pump 201 (thereby causing the pump to rotate), and into the extension chamber 109. This may result in compression of the damper, which in turn may damp or otherwise prevent excessive motion of the sprung mass in response to the external input. As would be recognized by one of ordinary skill in the art, this behavior is highly analogous to that of passive dampers.

However, if the rotational inertia associated with the pump is substantial, then the pressure difference that results from a given external input may not overcome rotational inertia associated with the pump 201. In such cases, the pump 201 may remain in an angularly fixed position or may not rotate fast enough to transport the necessary quantity of fluid in the available time, thereby effectively precluding or retarding fluid flow out of the compression chamber 111. In this case, the hydraulic damper 103 may be unable to compress or contract (e.g., it may be 'hydraulically locked'), or unable to compress or contract at a sufficient rate, in response to the external input. Likewise, a similar phenomenon may occur for external inputs in the extension direction 121. The damper may therefore demonstrate an undesirably high stiffness, and road input may be transferred from the unsprung mass, through the damper, and into the vehicle body with no or only minimal isolation or damping. Ride experience may consequently be degraded, leading to a "rough" ride. Observed stiffness may be especially high in response to: (a) high accelerations in damper motion (b) low amplitude external inputs or external inputs that result in low acceleration, which may not generate a sufficient pressure difference to overcome inertia associated with the pump; and/or (c) high frequency external inputs, which may not generate a pressure difference for a sufficient time to overcome inertia of the pump.

The rough ride problem may be further pronounced during conditions of active operation of the pump. Returning to FIG. 3, the motor 205 may driving the pump 201 to generate a commanded pressure differential by rotating in either a clockwise or counterclockwise direction. For example, the pump 201 may be driven by the motor 205 to generate a commanded pressure differential such that fluid pressure in the compression chamber 111 exceeds fluid pressure in the extension chamber 109, thereby causing an active force to be imparted in the extension direction 121. This may be done, for example, to maintain the vehicle body substantially level during a cornering event. If, while the pump is driven to generate the commanded pressure differential, an external input is applied to the piston rod in the compression direction 119 (e.g. if the vehicle hits a bump while at the same time the active suspension system is operating to hold the vehicle body during cornering), then fluid flow between chambers of the hydraulic damper may be effectively blocked due to the inertial mass of the pump. That is, unless the external input is large enough to exceed not only inertia of the pump but also torque being applied to the pump 201 by the motor 205, then the hydraulic damper will demonstrate undesirably high stiffness in response to the external input, and the force of the external input may be transferred through the hydraulic damper 101 and into the vehicle body.

Figure 4:
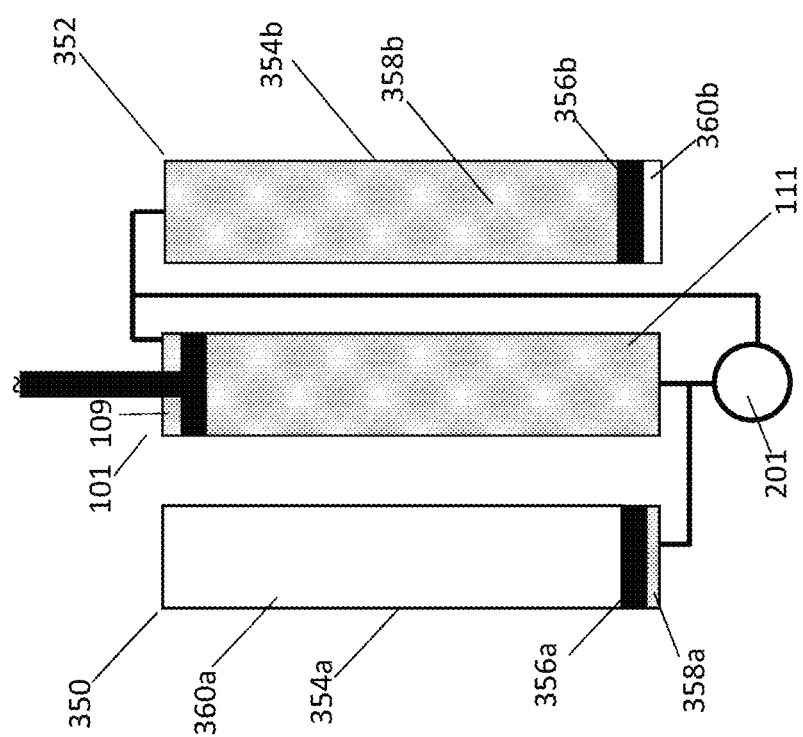
FIG. 4 illustrates an embodiment of an active suspension system component at a first suspension position.
Figure 5:
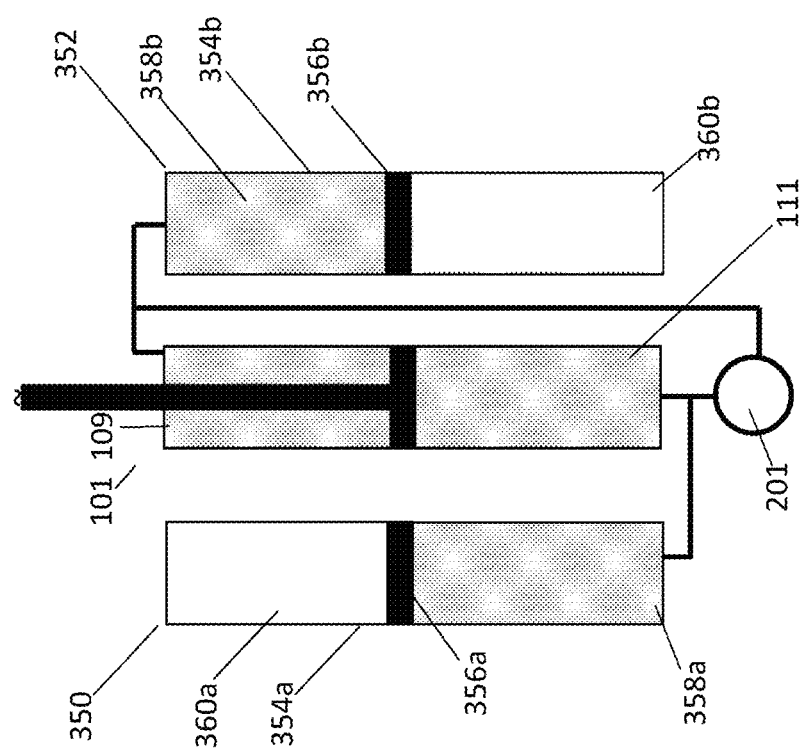
FIG. 5 illustrates the embodiment of FIG. 4 at a second suspension position.
Figure 6:
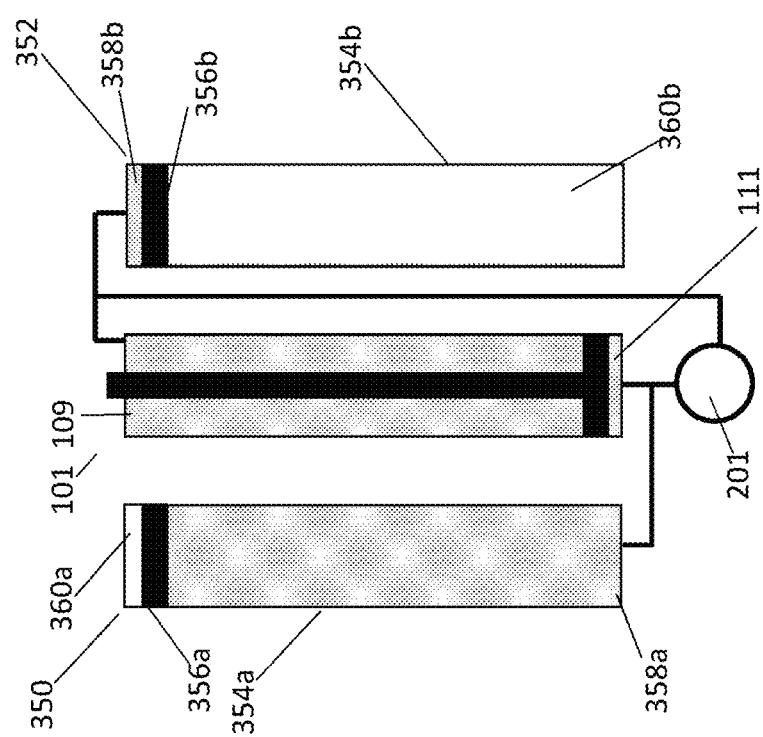
FIG. 6 illustrates the embodiment of FIG. 4 at a third suspension position.

The inventors have recognized that, in certain aspects, this "rough ride" problem may be at least partially mitigated by utilizing a suspension system component having two separate accumulators, as illustrated in the exemplary embodiments of FIG. 4-6. The two accumulators may include a compression accumulator 350 and an extension accumulator 352. As illustrated, in certain embodiments the compression accumulator 350 may be in direct fluid communication with the compression chamber 111. As used herein, the compression accumulator is said to be in "direct" fluid communication with the compression chamber, since fluid may flow from the compression accumulator 350 to the compression chamber 111 without passing through the pump. Further, in certain embodiments the extension accumulator 352 may be in direct fluid communication with the extension chamber 109. In certain embodiments, one or more valves (e.g., semiactive valves, variable orifice valves, etc.) may be fluidly disposed between the compression chamber 111 and the compression accumulator 350, and/or between the extension chamber 109 and the extension accumulator 352.

In the illustrated embodiment, during external compression of the damper, even if the inertia of the pump is large and not overcome by the pressure difference generated by the external input, fluid may flow from the compression chamber 111 and into the compression accumulator 350, while simultaneously fluid flow may occur from the extension accumulator 352 into the extension chamber 109. Consequently, the damper may compress without necessitating any fluid flow through the pump. FIG. 4-6 shows the suspension system component at various times during a compression stroke. In FIG. 5 the damper is compressed relative to FIG. 4. As can be seen by comparing FIG. 5 to FIG. 4, this compression may (assuming that no fluid flow passes through the pump) result in a decrease in the volume of liquid contained in the compression chamber 111, an increase in the volume of liquid contained in the compression accumulator 250, a decrease in the volume of liquid contained in the extension accumulator 352, and an increase in the volume of liquid contained in the extension chamber 109 (for clarity, liquid is shown as a light gray fill). These trends continue as the damper is further compressed, as can be seen by comparing FIG. 6 with FIG. 5.

The net effect of external compression, therefore, is fluid flow out of the compression chamber 111 and fluid flow into the extension chamber 109—however, notably, it is not necessary for any fluid to pass through the hydraulic pump 201. Likewise, in the case of external extension, fluid may flow from the extension chamber 109 into the extension accumulator 352, while fluid may flow from the compression accumulator 350 into the compression chamber 111. The net effect during external extension is therefore fluid flow out of the extension chamber 109 and fluid flow into the compression chamber 111—again, without requiring fluid to pass through the hydraulic pump 201. Therefore, inertia associated with the pump may be effectively bypassed, and the rough ride problem may be avoided. This arrangement may make the system sufficiently soft with regard to external compression but may also make the system less responsive under similar operating condition.

In certain embodiments, both the compression accumulator and the extension accumulator are located outside of the hydraulic cylinder. In certain embodiments, as shown in FIG. 4-6, each accumulator includes an accumulator housing 354*a*-*b* that at least partially defines an internal accumulator chamber. In certain embodiments, this accumulator housing 354*a*-*b* may be cylindrical. In certain embodiments, the accumulator may additionally include a barrier 356*a*-*b* that divides the internal accumulator chamber into a liquid chamber 358*a*-*b* that is at least partially filled with a liquid, and a gas chamber 360*a*-*b* that is at least partially filled with a gas. In the exemplary embodiment of FIG. 4-6, the barrier 360*a*-*b* is a piston that is slidably received within the accumulator housing 354*a*-*b*. In other embodiments, the barrier 360*a*-*b* may be a flexible bladder. As used herein, the "volume" of an accumulator refers to the total volume of fluid located within the accumulator housing. For example, for an accumulator having separate liquid chamber 358*a*-*b* and gas chamber 360*a*-*b*, the volume of the accumulator is therefore understood to refer to the sum of: (a) the volume of liquid within the liquid chamber at a given time and (b) the volume of gas within the gas chamber at the given time.

The inventors have recognized that in certain embodiments, to achieve desired performance over the entire stroke of the damper, the compression accumulator is preferably sized such that it can accommodate the entire volume of fluid displaced from the compression chamber during a complete compression stroke (e.g., from maximum extension to maximum compression). Likewise, the extension accumulator is preferably sized such that it can accommodate the entire volume of fluid displaced from the extension chamber during a complete extension stroke (e.g., from maximum compression to maximum extension). Accordingly, in certain embodiments, the volume of fluid contained in the compression accumulator at any given exceeds the volume of fluid contained in the hydraulic cylinder of the damper. Likewise, in certain embodiments, the volume of fluid contained in the extension accumulator at any given time exceeds the volume of fluid contained in the hydraulic cylinder of the damper. This results in accumulators that are each substantially larger than the accumulator generally found in passive or semiactive suspension systems.

In the active suspension system component illustrated in FIG. 4-6, the volume of fluid contained in the compression accumulator 350 is approximately equal to the volume of fluid contained in the hydraulic cylinder of the damper. As can be seen in FIG. 6, as the hydraulic damper approaches maximum compression, the volume of liquid in the compression chamber 111 of the damper approaches zero, with an increasing amount of liquid being contained in the liquid chamber of the compression accumulator 350. Since the compression accumulator includes both a gas chamber and a liquid chamber, as the volume of the liquid chamber increases, the volume of the gas chamber correspondingly decreases. Due to known gas laws, such compression of the gas chamber increases the pressure of the gas held in the gas chamber, thereby increasing effective stiffness of the compression accumulator. As a result, the stiffness of the compression accumulator increases as the damper is compressed. If the volume of the compression accumulator is approximately equal to the fluid volume of the hydraulic cylinder of the damper, then the compression accumulator may become overly stiff as the damper 101 is compressed. This may lead to poor ride experience when the damper is sufficiently compressed. For similar reasons, the extension accumulator may become overly stiff as the damper 101 is extended, potentially leading to poor ride experience when the damper is sufficiently extended.

In order to avoid the compression accumulator from becoming too stiff during large external compression events, the inventors have recognized that the compression accumulator may be sized such that the volume of fluid contained in the compression accumulator exceeds the volume of fluid contained in the hydraulic cylinder of the damper by a first factor. In certain embodiments, especially those where a soft compression accumulator is desired, the first factor may be above 3. In other embodiments, the first factor may be above 1.5. The first factor may be limited by packaging constraints since the larger the volume of the compression accumulator becomes, the more difficult packaging becomes in constrained spaces of automobiles. In various embodiments, the first factor may not exceed 5, 2.5, or 2.

For analogous reasons, in order to avoid the extension accumulator from becoming too stiff during large external extension events, the inventors have recognized that the extension accumulator may be sized such that the volume of fluid contained in the extension accumulator exceeds the volume of fluid contained in the hydraulic cylinder of the damper by a second factor. In certain embodiments, especially those where a soft extension accumulator is desired, the second factor may be above 3. In other embodiments, the second factor may be above 1.5. The second factor may be limited by packaging constraints since, the larger the volume of the extension accumulator becomes, the more difficult packaging becomes in constrained spaces of automobiles. In various embodiments, the second factor may not exceed 5, 2.5, or 2.

Due to the limited space available for packaging in an automotive applications, in certain situations it may be impractical or even impossible to fit accumulators having the relatively large sizes defined above into a vehicle's suspension system—e.g., it may not be practical or possible to package, in a vehicle, a suspension system component including a compression accumulator with a fluid volume exceeding the fluid volume of the hydraulic cylinder of the damper, and/or an extension accumulator with a fluid volume exceeding the fluid volume of the hydraulic cylinder of the damper. In light of such packing constraints, the inventors have recognized that various modifications may be made to an active suspension system component in order to allow the component to maintain a desired stiffness over an entire stroke of the damper, even if accumulators sized smaller than the previously disclosed sizes are utilized. These modification may include, for example, appropriately sized bypass valves, pressure relief mechanisms, addition of compliance elements, and/or other compliant mechanisms as disclosed herein.

Figure 7:
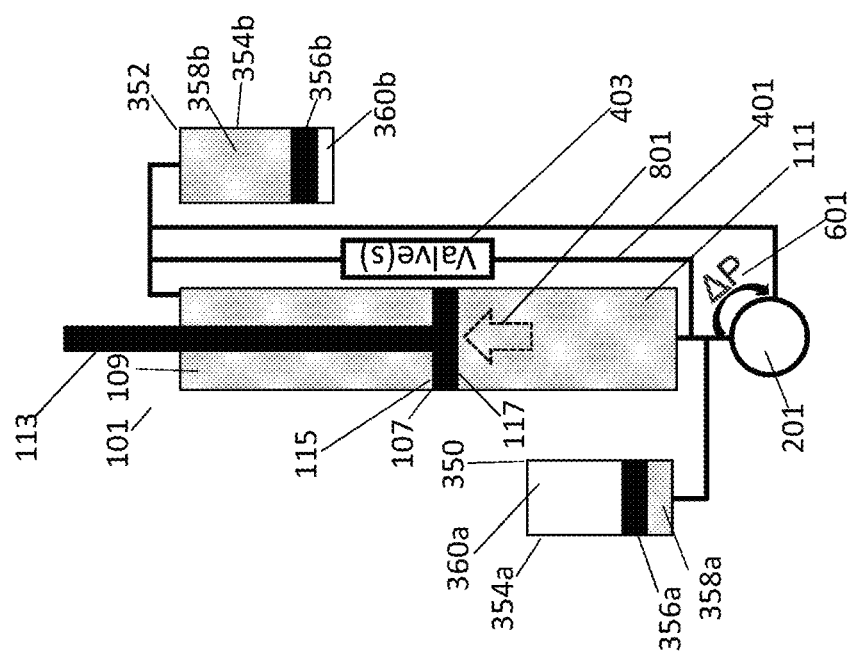
FIG. 7 illustrates an embodiment of an active suspension system component including one or more valves.
Figure 8:
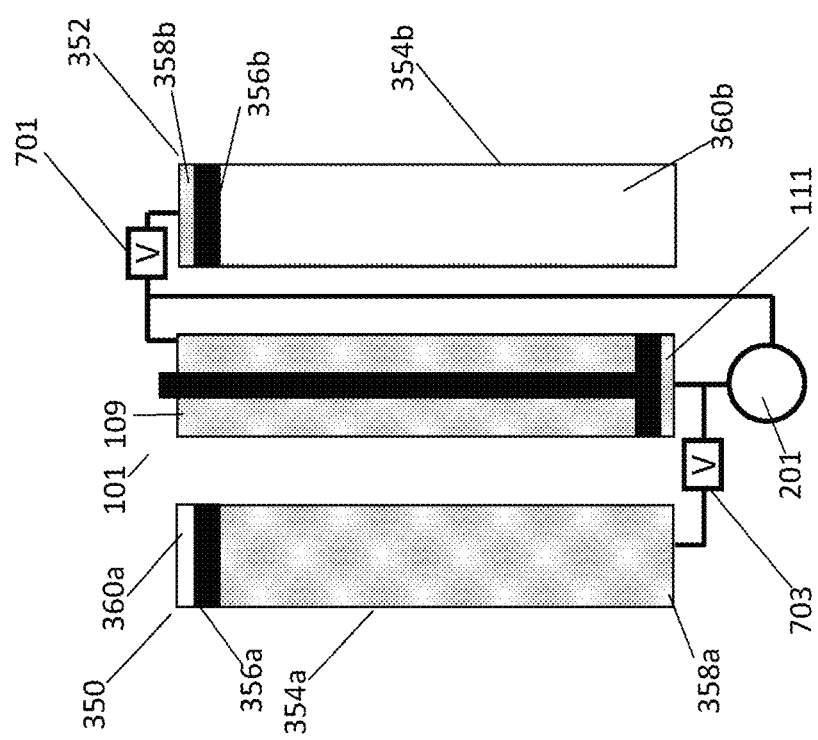
FIG. 8 illustrates an embodiment of an active suspension system component including one or more valves.

FIG. 7 illustrates an embodiment of an active suspension system component. The embodiment of FIG. 7 is similar to that of FIG. 4, with the incorporation of a bypass flow path 401 that includes one or more bypass valves 403. During large amplitude external compression or external extension events (e.g., such as those caused by traversing Class I or certain Class II displacements), the bypass valve(s) 403 may be opened to allow for flow from the compression chamber 111, through the bypass flow path 401, to the extension chamber 109 or from the extension chamber 109, through the bypass flow path 401, to the compression chamber 111 respectively. In this way, at least for certain operating modes of the bypass valves, fluid may flow between the compression chamber 111 and the extension chamber 109 without requiring rotation of the pump 201 (e.g., the inertia of the pump may be effectively bypassed). The compression accumulator 350 and/or extension accumulator 352 may therefore be smaller than $V_{max}$ and $V_{min}$, respectively, since they no longer need to accommodate the entirety of fluid from the compression chamber 111 and extension chamber 109 during external compression or external extension, respectively.

In certain embodiments, the bypass valves 403 may include a pair of blow off valves, wherein each blow off valve of the pair is arranged in opposing orientation relative to the other blow off valve of the pair. In these embodiments, each blowoff valve may be constructed to have a respective cracking pressure that exceeds a maximum operating pressure differential that the pump is configured to produce. In certain embodiments, the bypass valves 403 may include a pair of pressure balanced blow off valves. In certain embodiments, the bypass valves 403 may include at least one frequency dependent check valve. In certain embodiments, the bypass valves 403 may include a pair of frequency dependent check valves, wherein each frequency dependent check valve of the pair is arranged in opposing orientation relative to the other valve of the pair. An example of a frequency dependent check valve that may be utilized is described in page 245 of The Shock Absorber Handbook, by John C. Dixon, ISBN 978-0-470-51020-9. In a preferred embodiment, each frequency dependent check valve may be constructed to open (e.g., to allow flow from one side of the valve to the other) when pressure differential across the valve varies at frequencies exceeding a first threshold frequency, and to close (e.g., to substantially block flow from one side of the valve to the other) when pressure differential varies at frequencies not exceeding the threshold frequency. By constructing the frequency selective valve in such a way, the valves may be closed during active operation of the pump (which generally results in relatively low frequency variations of pressure differential), and may open for external compression or external extension caused by secondary ride events (which generally result in relatively high frequency variations of pressure differential). Additionally or alternatively, the frequency dependent check valve may be configured to at least partially open in response to an external input having a frequency exceeding the first threshold frequency, and to at least partially close in response to an external input having a frequency not exceeding the first threshold frequency. In various embodiments, the first threshold frequency may be between 3 Hz (near the natural frequency of a vehicle body of typical vehicles) and 12 Hz (near the wheel hop frequency of typical vehicles).

FIG. 7 illustrates an exemplary active suspension system component when the pump 201 is actively operated to establish a commanded pressure differential. A "commanded pressure differential" is understood to refer to a pressure differential that arises due to actively driving the pump with a motor. In FIG. 7, the electric motor (not shown) may be commanded to apply a torque on the pump 201 in a first direction 601, causing the pump 201 to generate a commanded pressure differential such that pressure of fluid in the extension chamber 109 exceeds pressure of fluid in the compression chamber 111 by the differential amount. It is assumed, for purposes of illustration, that the bypass valves 403 are closed, that the length of the damper 101 is fixed, and that the liquid in the system is effectively non-compressible. Since the length of the damper 101 is assumed to be fixed and the liquid is effectively non-compressible, there can be effectively no fluid flow out of, or into, the extension chamber 111; and effectively no flow out of, or into, the compression chamber 109.

Initially, when the electric motor first applies a torque onto the pump 201, the pump 201 will rotate causing some fluid to flow from the liquid chamber 358a of the compression accumulator 350, through the pump 201, and into the liquid chamber 358b of the extension accumulator 352. Since liquid flows out of the liquid chamber 358a of the compression chamber 350, the volume of the gas chamber 360a of the compression accumulator 350 correspondingly increases (causing a drop in pressure of the gas contained in the respective gas chamber 360a). Likewise, since liquid flows into the liquid chamber 358b of the extension accumulator 352, the volume of the gas chamber 360b of the extension accumulator 352 correspondingly decreases (causing an increase in pressure of as contained in the respective gas chamber 360b). The difference in pressure between gas in the gas chamber 360a of the compression accumulator 350 and gas in the gas chamber 360b of the extension accumulator 352 is equal to the commanded pressure differential. Theoretically (assuming no leakage across the pump 201, piston 107, and valves 403), once the commanded pressure differential is established, there is no more fluid flow in the system and the pump remains in a fixed angular position. Practically, there is always some amount of leakage that occurs across the pump 201, the piston 107, and/or the valves 403, and so the pump may need to be continually rotated in order to maintain the commanded pressure differential by compensating for the leakage.

As discussed previously, the observed stiffness of an active suspension system component may reach undesirably high levels in response to external inputs that occur while the pump is being actively operated to apply a pressure differential. Such situations may arise, for example, when the vehicle traverses a road surface feature (e.g., a bump, a pothole) while cornering. During cornering the inherent tendency of the vehicle is for the side of the vehicle closest to the center of rotation to lift up. During a cornering event, therefore, it may be desirable to actively operate the pump 201 of the active suspension system component to establish a commanded pressure differential in order to level the vehicle and/or minimize vehicle roll. During such a cornering event, it is possible that an inner wheel of the vehicle may experience an external input (e.g., by traversing a road surface feature) that results in an external input being applied to the piston in the extension direction 801. Due to the increased stiffness of the active suspension system component in response to an external input during active operation of the pump, degradation in ride experience may occur when certain external inputs occur simultaneously with active operation of the pump 201.

This increase in observed stiffness and corresponding degradation in ride experience may be especially prominent for external inputs at relatively high frequencies (such as a series of small, repeating irregularities in a ground surface) as compared to external inputs at relatively low frequencies. One explanation for such frequency dependency of observed stiffness is that external inputs that have sufficiently low frequencies are not sensitive to the inertia of the pump 201, thereby allowing fluid to flow across the pump and decreasing observed stiffness. External inputs that have relatively high frequencies—such as frequencies associated with wheel-hop may require higher accelerations of the pump and may therefore be more sensitive to the inertia of the pump. Flow through the pump (ignoring leakage) in response to external inputs with such relatively high frequencies may be effectively blocked, thereby effectively increasing observed stiffness. As an alternative or additional explanation, if actively controlled bypass valves are utilized to bypass the pump, there is generally a minimum response time associated with opening and closing the bypass valves. For high frequency external inputs, where durations of events may be less than the minimum response time associated with the bypass valves, the valves may become ineffective. Further, fluid mass within various flow paths of the suspension system component may give rise to fluid inertances and/or impedance that may effectively block fluid flow at high frequencies, leading to an increase in observed stiffness.

Figure 9:
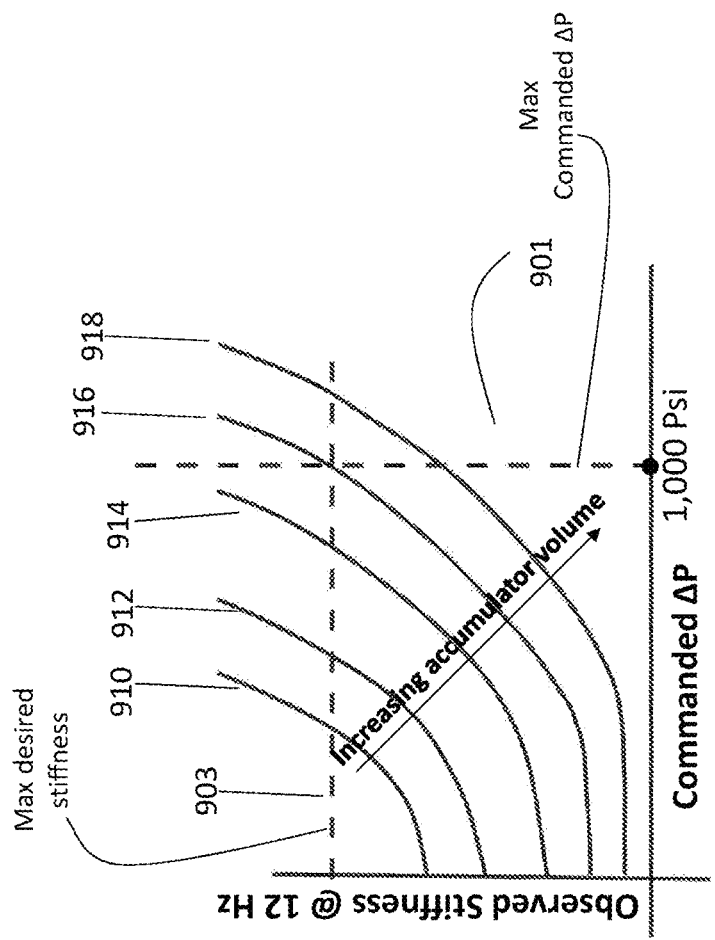
FIG. 9 illustrates a graph depicting a relationship between observed stiffness and commanded pressure differential.

In order to avoid such degradation in ride quality, the inventors have recognized that the observed stiffness of the suspension system component must be considered for the entire range of expected commanded pressure differentials, and for a range of input frequencies. FIG. 9 illustrates the stiffness of an exemplary suspension system component in response to external inputs having a frequency of 12 Hz on the y-axis, versus the commanded pressure differential on the x-axis. A vertical dashed line 901 has been shown on FIG. 9 to indicate the maximum commanded pressure differential expected during normal driving conditions. The inventors have recognized that, in normal driving circumstances over standard ground surfaces, for a vehicle having typical weight, piston size, and piston rod size, the maximum commanded pressure differential may be approximately 1,000 psi. Likewise, a horizontal dashed line 903 has been shown in FIG. 9 to highlight the maximum desired stiffness in response to external inputs at 12 Hz (which is near the wheel hop frequency of typical vehicles). The curves 910-918 represent the observed stiffness of the suspension system component having an extension accumulator of varying volumes (with curve 910 representing a component having the smallest extension accumulator volume, and curve 918 representing a component having the largest extension accumulator volume). A similar curve can be drawn for behavior based on volumes of the compression accumulator. The frequency of 12 Hz was selected because the natural wheel hop frequency of most vehicles tend to be near 12 Hz; however, other frequencies may also be considered. As would be recognized by one of skill in the art, such curves may also be functions of various accumulator parameters including precharge pressure and the amount of gas volume of each accumulator.

As can be observed from FIG. 9, the suspension system components represented by curves 910, 912, and 914 have stiffnesses that exceed the maximum desired stiffness at commanded pressure differentials below the maximum commanded pressure differential. Therefore, the suspension system components represented by curves 910, 912, and 914 are likely to suffer from ride degradation at least in certain driving conditions. On the other hand, the observed stiffnesses of the suspension system components represented by curves 916 and 918—which have larger extension accumulator volumes than those in 910-914—do not exceed the maximum desired stiffness for any commanded pressure differential less than the maximum commanded pressure differential. Therefore, the suspension system components represented by curves 916 and 918 are unlikely to suffer from ride degradation, at least under normal driving conditions.

Therefore, the inventors have recognized that the suspension system component may be constructed such that, for any commanded pressure differential below a maximum commanded pressure differential, the component's observed stiffness in response to external inputs having a first frequency preferably does not exceed a maximum desired stiffness. As a result of thorough experimentation and simulation, the inventors have recognized that the suspension system component may be preferably constructed such that, when the pump is operated to generate a commanded pressure differential of 1000 psi, the observed stiffness of the suspension system component, in response to external inputs having a first frequency and a first peak to peak amplitude, does not exceed a first maximum desired stiffness value. In certain embodiments, the first frequency may be 12 Hz, as this is approximately the wheel hop frequency typical of consumer vehicles, and the first peak to peak amplitude may be 5 mm, as this approximately corresponds to displacements typical of road surfaces. In certain embodiments, the first maximum desired stiffness value may be 80 N/mm. The inventors have recognized that the given values minimize the risk of ride degradation in typical vehicles due to excessive stiffness of an active suspension system component, even when actively operating the pump to actively apply forces sufficient for maintaining desired attitude of the vehicle during normal driving conditions. In various embodiments, the first frequency may be any value between 8-15 Hz, and the first peak-to-peak amplitude may be any value between 3-7 mm.

As described above, in certain applications it may be desirable to reduce the volume of the extension accumulator and/or compression accumulator (e.g., to accommodate packaging constraints) to values below those given by the above equations, while still remaining within the desired observed stiffness range described above. The inventors have recognized that such a suspension system component may be constructed by utilizing additional compliant mechanisms.

Figure 10:
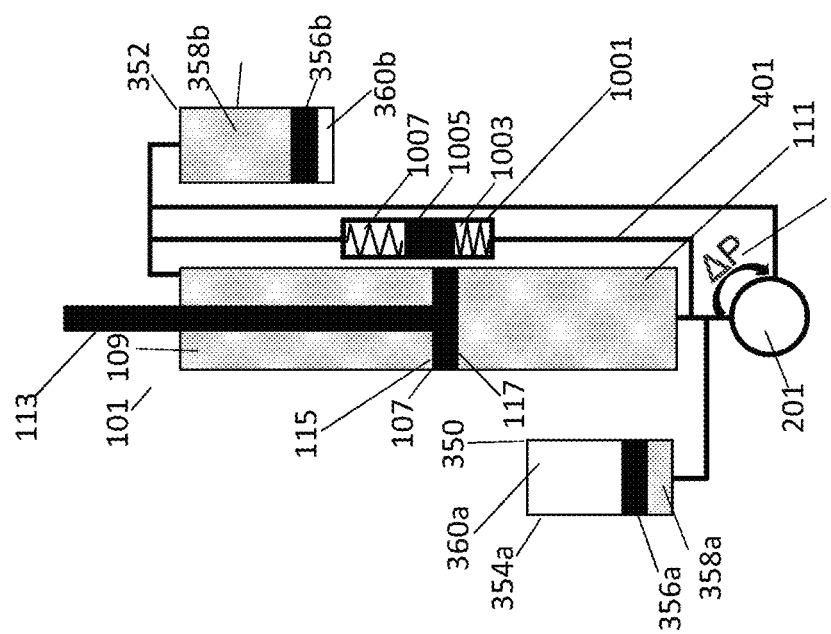
FIG. 10 illustrates an embodiment of an active suspension system component including a compliant mechanism.

For example, FIG. 10 illustrates a suspension system component having a compliant mechanism 1001 that includes a housing, a piston 1005, a first spring 1003 attached to a first face of the piston 1005, and a second spring 1007 attached to a second face of the piston 1005. Although not pictured, the suspension system component of FIG. 10 may also include a bypass flow path including one or more bypass valves. In the illustrated embodiment, the first face of the piston 1005 is exposed to fluid having a pressure equal to the pressure of fluid in the compression chamber 111, while the second face of the piston 1005 is exposed to fluid having a pressure equal to the pressure of fluid in the extension chamber 109. If the area of the first face exposed to fluid and the area of second face exposed to fluid are equal, then there will be a force on the piston 1005 that is proportional to the commanded pressure differential. This may cause the first spring 1003 to extend and the second spring 1007 to compress. In certain embodiments, the area of the first face exposed to fluid and the area of the second face exposed to fluid are effectively equal while in other embodiments they may be effectively different.

Figure 11:
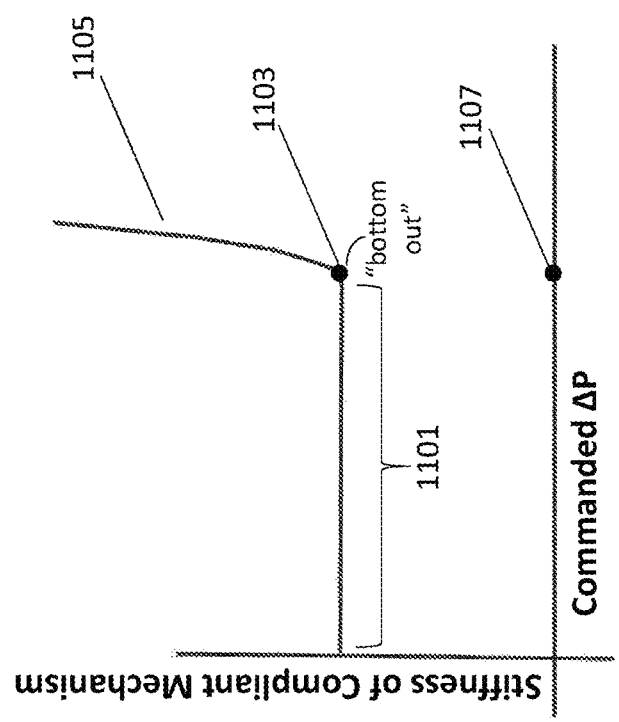
FIG. 11 illustrates a graph depicting a relationship between stiffness of a compliant mechanism and a commanded pressure differential.

In certain embodiments, the first spring 1003 and the second spring 1007 have an effectively constant spring rate over at least some range of displacement, such as is known for standard coil springs. In these embodiments, the stiffness of the compliant mechanism 1001 is constant, regardless of the effective pressure differential. The stiffness of the compliant mechanism 1001 may remain constant until the commanded pressure differential results in displacement of the piston that is sufficient to cause at least one of the springs 1001,1007 to "bottom out", at which time the spring becomes effectively infinitely stiff. This behavior is shown in FIG. 11, which illustrates the stiffness of the compliant mechanism 1001 on the y-axis and the effective pressure differential on the x-axis. As can be seen from FIG. 11, the stiffness is effectively constant for a first range 1101 of commanded pressure differentials, until at a given effective pressure differential 1107 at least one of the first spring 1003 and second spring 1007 bottoms out, thereby resulting in a sharp increase 1105 in stiffness of the compliant mechanism. In order to avoid the spring bottoming out, the length of each of the first spring 1003 and second spring 1007 should be sized by considering the maximum expected effective pressure differential in each direction, the respective spring rates of the first spring 1003 and the second spring 1007, the area of the first face of the piston 1005 exposed to fluid, and the area of the second face of the piston 1005 exposed to fluid. Alternatively or additionally, the first spring and/or second spring may include one or more non-linear portions designed to prevent sharp changes in stiffness.

Continuing with FIG. 11, compliance on the extension chamber 109 side of the pump may be provided by both the extension accumulator 352 and by the compliant mechanism 1001. In general, when two compliant elements are present in a circuit, the compliance of the overall system is dominated by the compliance of the most compliant (i.e., least stiff) element. In FIG. 10, the stiffness extension accumulator 352 (and therefore the compliance of the extension accumulator 352) varies with effective pressure differential. On the other hand, the stiffness of the compliant mechanism 1001 is independent of effective pressure, at least over a first range of commanded pressure differentials 1101.

Figure 12:
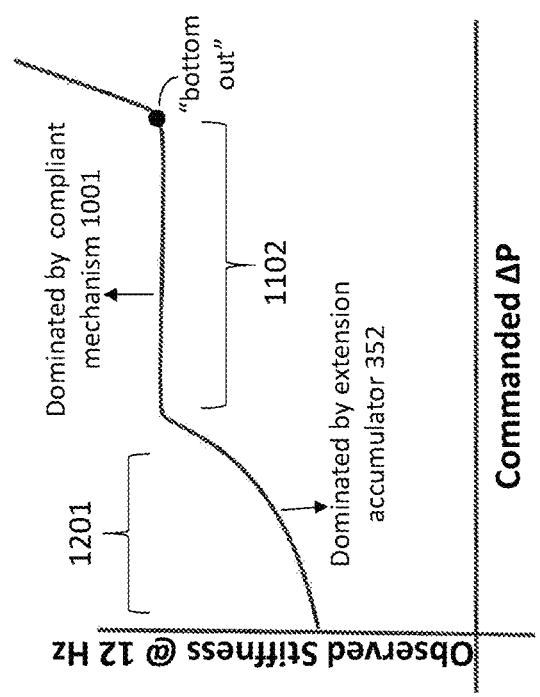
FIG. 12 illustrates a graph depicting a relationship between observed stiffness and a commanded pressure differential of a suspension system component having a compliant mechanism.

As a result, the combined observed stiffness of the suspension system component that incorporates both an extension accumulator 352 and a compliant mechanism 1001 is shown in FIG. 12. For an initial range 1201 of effective pressure differentials, the extension accumulator 352 is more compliant than the spring mechanism 1001, and so the observed stiffness of the suspension system component is dominated by the stiffness of the extension accumulator 352. As the commanded pressure differential is increased, the stiffness of the extension accumulator 352, and thus the overall observed stiffness of the suspension system component, increases. Eventually the extension accumulator 352 becomes more stiff than the spring mechanism 1001, at which point the observed stiffness of the suspension system component is dominated by the stiffness of the compliant mechanism 1001, at least until one of the springs 1003, 1007 of the compliant mechanism 1001 bottoms out. If a compliant mechanism 1001 is utilized, it is no longer necessary for the extension accumulator 352 to remain below the maximum desired stiffness over the entire range of commanded pressures (up to the maximum expected commanded pressure), therefore allowing for use of smaller extension accumulators. For commanded pressure differential in the opposite direction, the same reasoning holds true for the compression accumulator. In certain embodiments, the compliant mechanism 1001 may be constructed such that (a) the suspension system component has an observed stiffness, in response to an external input having a frequency of 12 Hz and a peak to peak amplitude of 5 mm, that is less than the maximum desired stiffness and (b) it has sufficient length that it does not bottom out even at the maximum commanded pressure differential. In certain embodiments, the compliant mechanism 1001 may be constructed such that the suspension system component has an observed stiffness, in response to an external input having a frequency of 12 Hz and a peak to peak amplitude of 5 mm, that is less than the maximum desired stiffness when the pump is driven to generate a commanded pressure differential of 1000 psi. In certain embodiments, the maximum desired stiffness is 80 N/mm. In certain embodiments, the observed stiffness, in resp An exemplary method is now disclosed to determine the observed stiffness of an active suspension system component (e.g., an active suspension system component according to any of the embodiments disclosed herein) in response to an oscillating external input having a certain frequency and amplitude. In the exemplary method, the damper is held in an approximately mid-stroke position in a shock dynamometer (often referred to in the art as a dyno). In order to evaluate observed stiffness of the suspension system component during active operation of the pump, the pump of the suspension system component may optionally be driven (e.g., a torque may be applied to the pump by a motor) in order to generate a commanded pressure differential (e.g., a commanded pressure differential of 1000 psi) across the pump. This commanded pressure differential may be in either direction. Since the damper is held at mid-stroke (that is, it is not allowed to contract or extend), active operation of the pump may result in generation of, and sustained maintenance of, the commanded pressure differential. Once static conditions are reached and with the pump being actively driven to maintain the commanded pressure differential, the dynamometer may be operated to apply a preprogrammed external input onto the distal end of the piston rod. This preprogrammed external input may include an oscillating series of displacements (e.g., applied to one end of the piston rod and transferred to the piston) that vary according to a first frequency (e.g., 12 Hz, e.g., a wheel hop frequency of a vehicle. For example, the dynamometer may be commanded to continuously and repeatedly move the piston rod (and therefore the piston) by a certain amount relative to the housing of the hydraulic cylinder in an oscillating manner. In certain embodiments, the peak to peak amplitude of the external input may be 5 mm. In certain cases, the external input may consist only of the oscillating series of displacements. In other cases, it may be useful to overlay the oscillating series of displacements with a D.C. offset force, so that the piston is constantly moving and stiction effects may be ignored. During application of the external input, the length of the hydraulic damper, the position of the piston (which are directly related) and/or a reaction force exerted by the hydraulic system on the piston rod in response to the external input may be monitored in real time and, together with the known properties of the external input may be used to determine an observed stiffness. As described herein, this stiffness may be a function of the commanded pressure differential and/or of the frequency of the input; therefore, when referring to an observed stiffness it may be necessary to specify a corresponding commanded pressure differential and the frequency of the input.

In certain embodiments, a vehicle may comprise a plurality of suspension system components such as those disclosed herein. For example, one suspension system component may be located at each wheel of a vehicle. A four wheeled vehicle may therefore have four distinct suspension system components. In certain embodiments, each suspension system component may be hydraulically isolated from each other suspension system component of a vehicle, such that fluid communication between different suspension system components within a single vehicle may be prevented. In other embodiments, there may be fluid communication between different suspension system components in order to, for example, achieve increased anti-roll control.

As used herein, "fluid" refers to liquid and gas. As used herein, a first component is said to be in "fluid communication" with a second component if a path exists through which, for at least one operating condition, fluid may flow from the first component to the second component. As used herein, a first component is said to be in "selective fluid communication" with a second component if a path exists through which, for at least a first operating condition, fluid may flow from the first component to the second component and through which, for at least a second operating condition, fluid is prevented from flowing from the first component to the second component. As would be recognized by one of ordinary skill, selective fluid communication may be achieved using, for example, at least one valve that, in a first operating condition (e.g., when the valve is in an 'open' position), effectively allows for fluid flow therethrough but that, in a second operating condition (e.g., when the valve is in a 'closed' position), effectively prevents fluid flow therethrough. As used herein, a first component is said to be in "variable fluid communication" with a second component if a path exists through which fluid may flow from the first component to the second component, and wherein the hydraulic resistance of the path may be controllably varied. As would be recognized by one of ordinary skill, variable fluid communication may be achieved using, for example, a variable orifice valve or other flow control valve.

As used herein, electric motor refers to any device capable of converting electrical energy into mechanical energy. A non-limiting example of an electric motor is a brushless dc motor (BLDC motor). An electric motor may be capable of operating as an electric generator in certain operating modes and as an electric motor in other operating modes. A hydraulic pump refers to any device capable of converting mechanical energy into hydraulic energy (e.g., a pressure differential between fluid in two different chambers). A hydraulic pump may be capable of operating as a hydraulic motor in certain operating modes and as a hydraulic pump in other operating modes.

Nested Hydraulic Accumulator Assembly

Hydraulic systems are used in a variety of applications including, for example, in vehicles and particularly in vehicle suspension systems. Certain applications may allow for only limited space in which a given hydraulic system must physically fit. Therefore, packaging size and space constraints may be a significant obstacle in the integration of hydraulic systems into certain applications such as, for example, automotive applications. This obstacle may be especially pronounced for hydraulic systems that utilize a plurality of accumulators, as each accumulator in a hydraulic system occupies some volume and contributes to the overall volume of the hydraulic system. Disclosed herein are embodiments of a nested accumulator assembly that allow for increased flexibility in packaging multiple accumulators into a hydraulic system, and/or a decrease in packaging size for hydraulic systems utilizing multiple accumulators.

In certain hydraulic systems, it may be desirable to utilize a plurality of accumulators in order to, for example, mitigate hydraulic noise present in various parts of the hydraulic system and/or to provide compliance to various parts of the hydraulic system. However, in some applications that utilize a hydraulic system, strict limits may exist on the amount of space available for packaging of the hydraulic system. In automotive applications, for example, the space available for packaging of hydraulic systems is generally constrained since such systems must fit in the available space found, for example, under the hood of the vehicle, under the vehicle body, in the wheel wells of the vehicle, etc. As utilization of multiple accumulators may result in an increase in packaging size of a hydraulic system, incorporating multiple accumulators may be prohibitively difficult in some applications (e.g., a vehicle suspension system) where the physical packaging envelope is highly constrained. Accordingly, the Inventors have recognized the benefits of incorporating multiple accumulators into a single housing to allow for reduced packaging demands while maintaining multiple, independently functioning accumulators. Further benefits of such "nested accumulator" assemblies may also include limiting long hydraulic fluid runs, and an overall simplification of hydraulic systems.

In one aspect, a nested accumulator assembly is disclosed. The nested accumulator assembly may include a first accumulator that includes a housing that at least partially defines an internal volume. The internal volume may be separated into a first chamber and a second chamber by a mechanical member such as, for example, a piston (e.g., a floating piston or a spring loaded piston), an elastic diaphragm, or an enclosed bladder. The mechanical member may include a sealing element (e.g., an o-ring), and may be sealingly connected to the walls of the accumulator housing so that any fluid in the first chamber is separated from any fluid in the second chamber. In certain embodiments, the first chamber contains a compressible fluid (e.g., a gas), and may be referred to as a gas charged chamber. The second chamber may be at least partially filled with a non-compressible hydraulic fluid and may be referred to as a hydraulic fluid chamber. In certain embodiments, the first chamber may alternatively or additionally include a spring element that mechanically attaches the piston to the housing.

In certain embodiments, a second accumulator may be located within the internal volume of the first accumulator (e.g., within the first chamber or second chamber of the first accumulator). This second accumulator may function independently within the environment of the primary accumulator. By locating the second accumulator within the internal volume of the first accumulator, overall packaging volume may be reduced while maintaining full system functionality. In certain applications, even if the overall packaging size of a given hydraulic system is not reduced by utilizing nested accumulators, such nested accumulators may nevertheless allow for additional flexibility to fit the hydraulic system into a constrained space.

In some embodiments an array of mechanical offsets is fixedly attached to the top and/or bottom face of the floating piston. These offsets may help prevent the hydraulic noise inducing effects of viscous flow between the piston face and other planar surfaces when the piston is fully extended in one direction.

Figure 13:
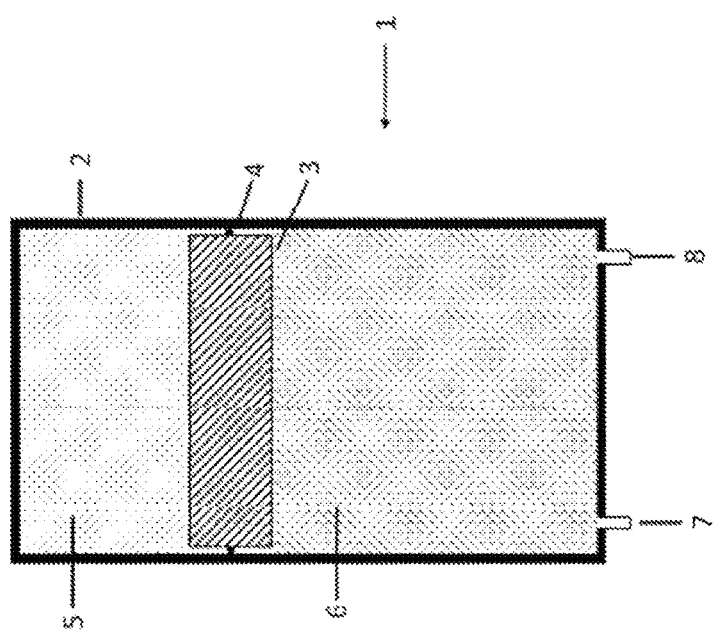
FIG. 13 illustrates an embodiment of a single hydraulic accumulator.

FIG. 13 illustrates an embodiment of an accumulator 1, specifically a floating piston-type gas-charged accumulator. The accumulator 1 may include a cylindrical accumulator housing 2 that at least partially defines an internal volume. In the illustrated embodiment, slidably disposed within the accumulator housing 2 is a floating piston 3 that is sealingly connected, via a sealing element 4 (e.g., an o-ring), to an internal surface of a wall of the accumulator housing 2. As illustrated, the piston 3 divides the internal volume of the accumulator into a gas-charged chamber 5 and a hydraulic fluid chamber 6. The gas-charged chamber 5 contains a gas or other compressible fluid, while the hydraulic fluid chamber is at least partially filled with a non-compressible hydraulic fluid. The gas may be a pressurized inert gas that provides a restoring force on the piston 4 in response to movement of the piston 4 relative to the accumulator housing 2. The accumulator 1 may further include one or more ports arranged to allow hydraulic fluid to ingress and/or egress the hydraulic fluid chamber from/to other portions of a hydraulic system. In certain embodiments, the accumulator 1 includes only a single port, while in other embodiments the accumulator 1 may include at least a first port 16 and a second port 17.

Figure 14:
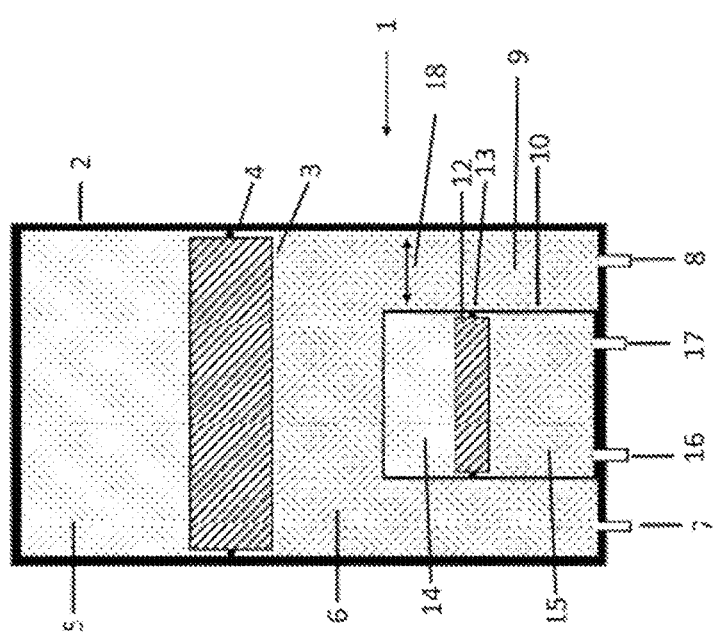
FIG. 14 illustrates an embodiment of a nested accumulator assembly.

FIG. 14 is an illustration of an embodiment of a nested accumulator assembly. The exemplary nested accumulator assembly includes a first accumulator 1 substantially similar to the one described with respect to FIG. 13. The first accumulator may include a first accumulator housing 2 that at least partially defines a first internal volume, a piston sealingly connected (e.g., via an o-ring) to an internal surface of a wall of the first accumulator housing, and a piston 3 that divides the first internal volume into a first gas-charged chamber 5 and a first hydraulic fluid chamber 6.

The illustrated nested accumulator assembly further includes a second accumulator 9. At least a portion of the second accumulator 9 may be disposed within the first internal volume (e.g. within the first hydraulic fluid chamber 6) of the first accumulator 1. The second accumulator may include a second accumulator housing 10 that at least partially defines a second internal volume, and a second piston 12 sealingly connected to an internal surface of a wall of the second accumulator housing 10 (e.g., via a sealing element 13 (e.g., an o-ring) included in the second piston). The second piston 12 may divide the internal volume of the second accumulator 9 into a second gas-charged chamber 14 and a second hydraulic fluid chamber 15. The second accumulator 9 may further include one or more ports 16, 17 to allow for hydraulic fluid to egress and/or ingress the second hydraulic fluid chamber. As would be recognized by one of skill in the art, the second accumulator 9 functions via a mechanism substantially similar to the primary accumulator 1, except that the size of the second accumulator may allow it to fit partially or entirely within the internal volume (e.g., the hydraulic fluid chamber 6) of the first accumulator. The second accumulator 9 may operate independently within the environment of the primary accumulator 1. The disclosed physical arrangement of the two accumulators, in which the second accumulator is at least partially disposed in the internal volume of the first accumulator, may allow for a reduction in the overall packaging requirements while maintaining system functionality.

In certain embodiments, a gap 18 may exist between an outer portion of the second accumulator housing 10 and an inner portion of the first accumulator housing 2. In certain embodiments, this gap may be annular, depending on the geometries of the respective housings. In certain embodiments, it may be desirable to tune this gap 18 to obtain advantageous hydraulic fluid flow characteristics into and/or out of the first accumulator. For example, the gap 18, if appropriately sized, may function as a fluid restriction element and/or a fluid inertance element. By controlling the dimension of the gap 18, the hydraulic resistance and/or hydraulic inertance may be controlled for the hydraulic system as a whole.

In certain embodiments, the first accumulator housing and second accumulator housing may share one or more walls or portions thereof. Further, in certain embodiments, rather than or in addition to being at least partially disposed within the first hydraulic fluid chamber 6, the second accumulator may be at least partially disposed in another portion of the first internal volume such as, for example, the first gas charged chamber. Furthermore, while the nested accumulator assembly of FIG. 14 illustrates a two-accumulator system, the disclosure is not so limited in this regard. Other embodiments could feature multiple accumulators disposed within the first internal volume of the first accumulator; or could feature a third accumulator disposed within the second internal volume of the second accumulator. Additionally, it is recognized that the system may be trivially modified such that the first accumulator and/or second accumulator may be a spring-loaded accumulator rather than a gas-charged accumulator as illustrated.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

What is claimed is:

1. A nested accumulator assembly for a hydraulic system, the nested accumulator assembly comprising:
    a first accumulator including:
        a first accumulator housing that at least partially defines a first internal volume; and
        a first piston that divides the first internal volume into a first gas-charged chamber and a first hydraulic fluid chamber; and
    a second accumulator including:
        a second accumulator housing that at least partially defines a second internal volume; and
        a second piston that divides the second internal volume into a second gas-charged chamber and a second hydraulic fluid chamber;
    wherein at least a portion of the second accumulator is disposed within the first internal volume.

2. The nested accumulator assembly of claim 1, wherein the first accumulator further includes one or more ports that allow fluid to ingress the first hydraulic fluid chamber, and wherein the second accumulator further includes one or more ports that allow fluid to ingress the second hydraulic fluid chamber.

3. The nested accumulator assembly of claim 1, wherein the second accumulator is entirely disposed within the first internal volume.

4. The nested accumulator assembly of claim 1, wherein the second accumulator is at least partially disposed within the first hydraulic fluid chamber.

5. The nested accumulator assembly of claim 4, wherein an entirety of the second accumulator is disposed within the first hydraulic fluid chamber.

6. The nested accumulator assembly of claim 1, wherein a portion of a wall of the first accumulator housing is attached to a portion of a wall of the second accumulator housing.

7. The nested accumulator assembly of claim 1, wherein the first accumulator housing and the second accumulator housing share at least a portion of a wall.

8. The nested accumulator assembly of claim 1, further including a gap between an outer surface of the first accumulator housing and an inner surface of the second accumulator housing.

9. The nested accumulator assembly of claim 8, wherein the gap acts as a fluid restriction element that restricts flow into the first hydraulic fluid chamber.

10. The nested accumulator assembly of claim 8, wherein the gap acts as a fluid restriction element that restricts flow out of the first hydraulic fluid chamber.

11. The nested accumulator assembly of claim 8, wherein the gap acts as a fluid inertance element.

* * * * *